United States Patent [19]
Armitage

[11] 3,957,316
[45] May 18, 1976

[54] FLEXIBLE PIVOT

[76] Inventor: Harry J. Armitage, 1546 Cavitt Road, Monroeville, Pa. 15146

[22] Filed: Mar. 27, 1975

[21] Appl. No.: 562,660

Related U.S. Application Data

[62] Division of Ser. No. 409,314, Oct. 24, 1973, Pat. No. 3,892,090.

[52] U.S. Cl. .............................. 308/2 A; 403/220
[51] Int. Cl.² ........................................ F16C 11/12
[58] Field of Search ............ 74/17.8, 18.1; 308/2 A; 403/121, 52, 220

[56] References Cited
UNITED STATES PATENTS

| | | | |
|---|---|---|---|
| 2,960,302 | 11/1960 | Brown | 308/2 A |
| 3,288,541 | 11/1966 | Tracy | 403/220 X |
| 3,384,424 | 5/1968 | Raines | 403/220 X |
| 3,394,970 | 7/1968 | Tracy | 403/220 X |

Primary Examiner—Al Lawrence Smith
Assistant Examiner—Nicholas P. Godici
Attorney, Agent, or Firm—Hymen Diamond

[57] ABSTRACT

The flexible pivot includes a plurality of pairs of crossed flexible strips, each pair anchored in a pair of blocks at an angle to each other. The strips are displaced from each other edgewise and if they engage at all, engage at centers of their edges which do not move. The strips extend, and are capable of flexing, between the blocks. The intersections of the planes defined by the pairs of strips when unflexed, define a common line which is the axis of the flexible pivot. One of the blocks of each pair is secured firmly to a rigid support and the other block of each pair to a member which is pivoted. The strips are limited to flexing over a very small angle but the member which is pivoted may be mounted remotely from the axis so that the displacement of this member is amplified and is substantial.

11 Claims, 17 Drawing Figures

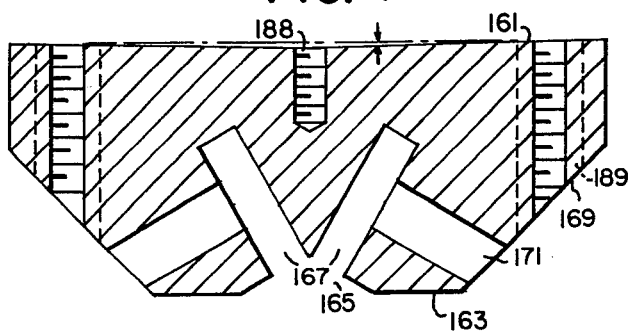
FIG. 7
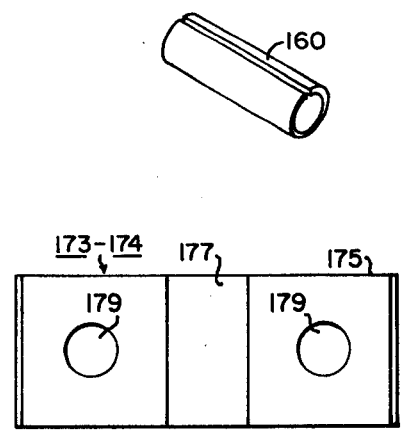
FIG. 11
FIG. 9
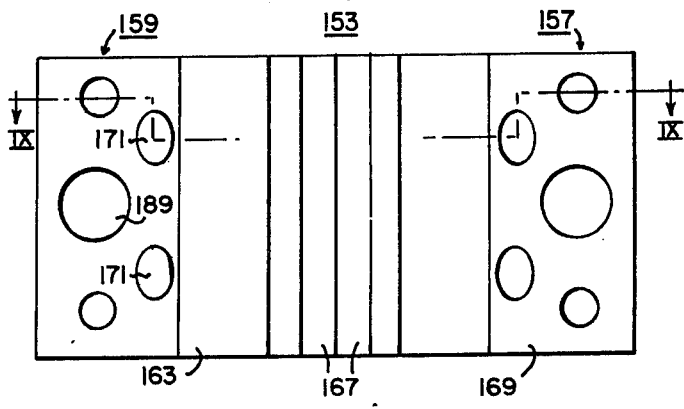
FIG. 6
FIG. 10
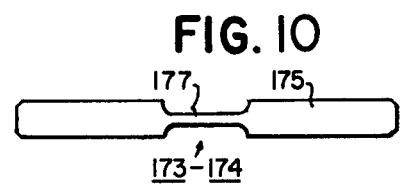
FIG. 5
FIG. 8
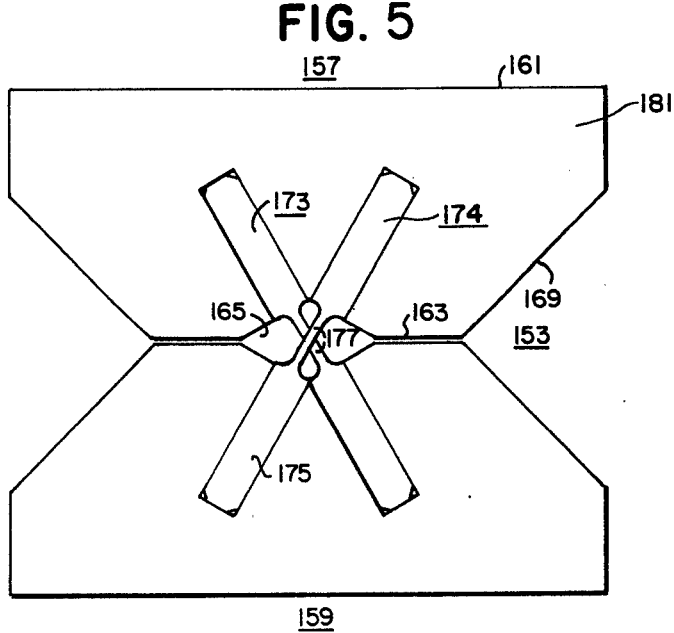
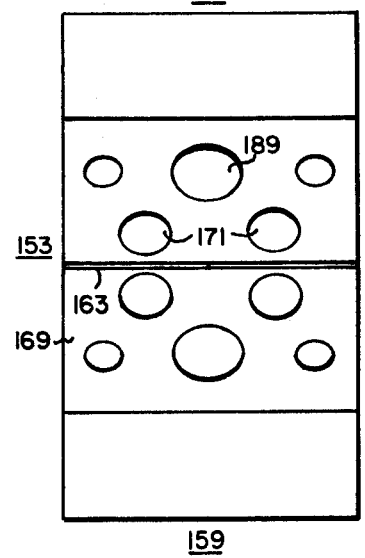

:

FLEXIBLE PIVOT

REFERENCE TO RELATED APPLICATION

This application is a division of Ser. No. 409,314 filed Oct. 24, 1973 and now U.S. Pat. No. 3,892,090 granted July 1, 1975 to Harry J. Armitage for WORK SHAPING APPARATUS.

BACKGROUND OF THE INVENTION

The parent patent relates to work-forming or work-shaping in the practice of which work blanks are ground to a predetermined contour and the grinding is controlled by a cam which causes a grinding wheel and a cam to move towards and away from each other so that the desired contour of the work, governed by the cam, is produced automatically. In this work shaping the work, typically, is rotatably supported on a rocker support which is mounted on a flexible or resilient pivot and which is rocked about this pivot in accordance with the contour of the cam.

An object of this invention is to provide a flexible pivot which is uniquely suitable to be integrated in the above-described work-shaping apparatus but also has general applicability.

SUMMARY OF THE INVENTION

In accordance with this invention a flexible pivot is provided which includes a pair of resilient members and a pair of blocks. Each resilient member is of generally I-shape but with long wide rigid ends and a short very-thin central flexible web. The members are anchored edgewise at an angle to each other in the blocks with the ends secured to the blocks. The blocks are spaced a short distance apart and the flexible webs or strips extend freely between the blocks and can flex. The line defined by the intersection of the planes defined by the strips constitutes the axis of the pivot.

In accordance with the invention of the parent patent a plurality of flexible pivots are mounted, between a fixed support and the rocker support, with their axes colinear. One block of each pivot is connected rigidly to the fixed support and the other to the rocker support. Under the control of the cam, the rocker support rocks about the axis of the array of pivots moving the blocks to which it is connected relative to the blocks connected to the fixed support and flexing the strips. The flexing of the strips is limited to a small angle by the blocks which are spaced a very small distance but the components which are being rocked are suspended from the rocker support at a substantial distance from the pivot axis and are capable of being rocked with a substantial amplitude.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings. In the interest of concreteness this description and drawings show the flexible pivot according to this invention integrated into the work-shaping machine disclosed in the parent patent. It is not intended that this should in any way limit the scope of this invention. In the drawings:

FIG. 5 is a view in side elevation of a resilient or flexing pivot in accordance with this invention;

FIG. 6 is a plan view of one of the blocks of the pivot shown in FIG. 5;

FIG. 7 is a view in section taken along line VII—VII of FIG. 6;

FIG. 8 is a view in end elevation of the block shown in FIGS. 5, 6 and 7;

FIG. 9 is a plan view of a resilient or flexing member of the pivot shown in FIG. 5;

FIG. 10 is a view in side elevation of this flexing member;

FIG. 11 is an isometric view of a split pin used to secure the flexing member to the blocks in the flexing pivot according to this invention.

FIGS. 12 through 17 are presented solely for the purpose of aiding those skilled in the art in practicing this invention and not with any intention of in any way limiting this invention.

DETAILED DESCRIPTION OF EMBODIMENT

Figure 1:
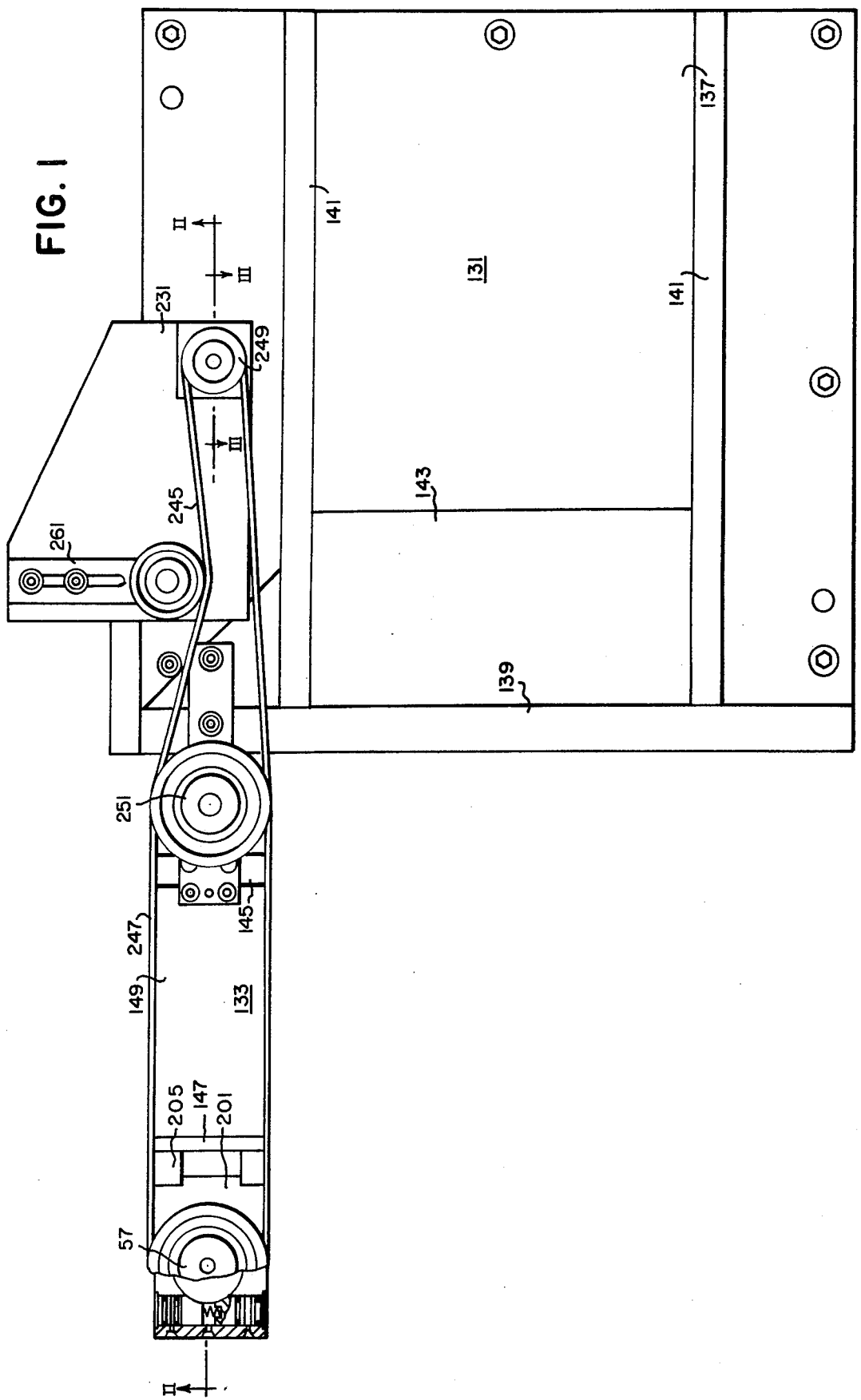
FIG. 1 is a plan view of the part of the work-shaping apparatus, into which the pivot according to this invention is integrated, showing the work-clamping means and its pivotal support for the flexing or resilient pivot in accordance with this invention.

In the drawings the flexible pivot according to this invention is shown integrated into work-grinding apparatus in which the work being ground is rocked under the control of a cam in engagement with a grinding wheel. The work is clamped by work-clamping assembly 31 including a head stock 51 and a tail stock 53 by which the work (not shown) is clamped. The work-clamping assembly 31 is suspended from a flexible suspension 33 (FIGS. 1–4).

The flexible or rocker suspension 33 for the work-clamping assembly 31 includes a rigid massive fixed support 131, a rigid massive rocker support 133 (FIGS. 1, 2) and flexible or resilient connecting assembly 135 according to this invention for suspending the rocker support 133 from the fixed support 131. The connecting assembly 135 serves as a flexing pivot about which the rocker support 133 rocks.

The fixed support 131 includes an angle plate having a base 137 (FIG. 4) secured to the table 39 (FIGS. 2, 3) and a vertical plate 139. The vertical plate 139 is strengthened by gussets 141 between which a strengthening plate 143 (FIG. 4) extends.

The rocker support 133 includes a pair of plates 145 and 147 to which strengthening cross plates 149 and diagonal plates 151 are welded to form a rigid massive structure.

Figure 14:
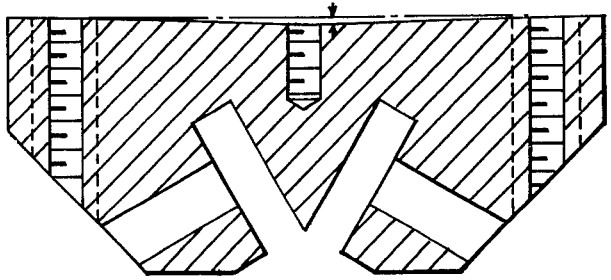
FIGS. 12, 13, 14, 15, 16, 17 are similar to FIGS. 5 through 11 but show the dimensions of a typical flexing pivot used in the practice of this invention.
Figure 16:
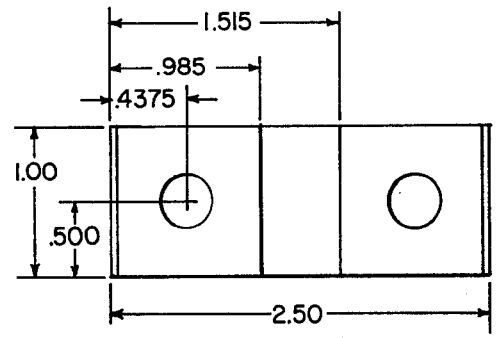
Figure 13:
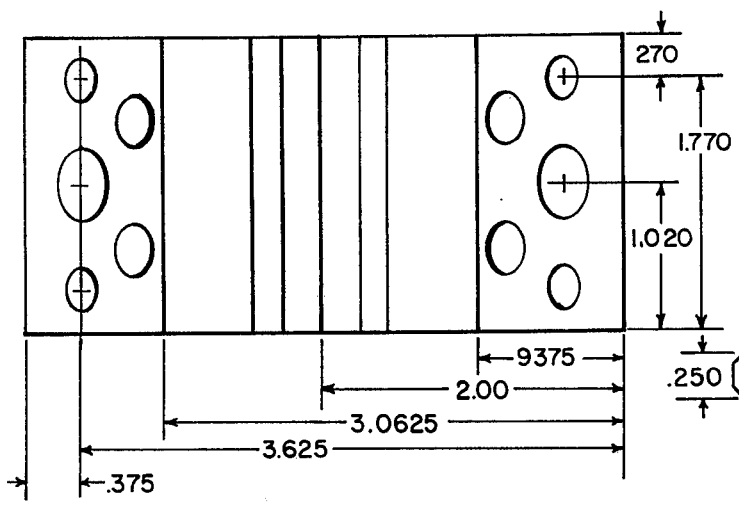
Figure 17:
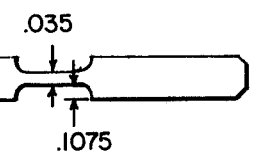
Figure 12:
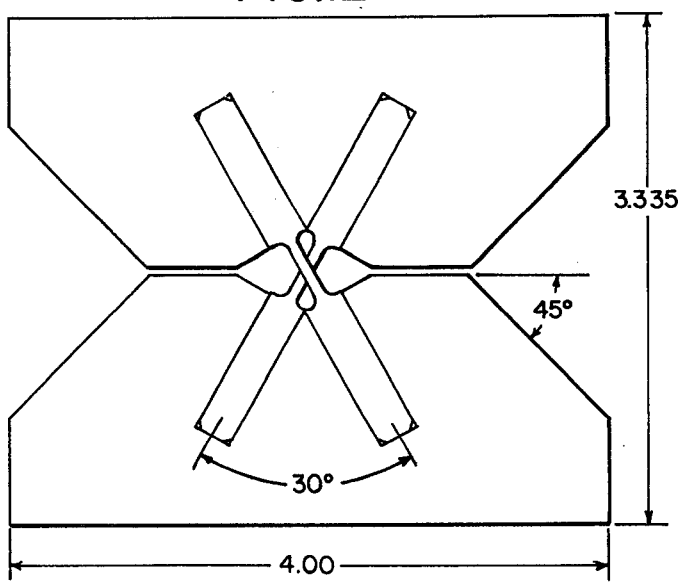
Figure 15:
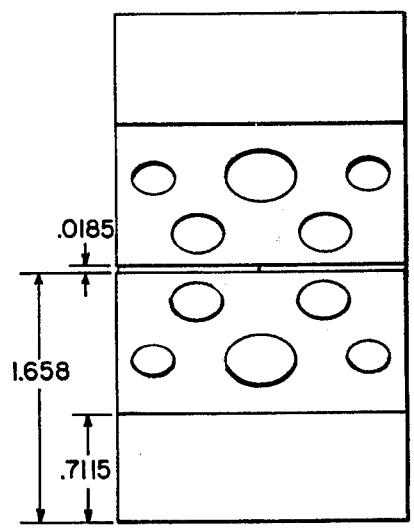

The flexible or resilient suspension 135 (FIG. 1) includes a plurality of flexible pivots 153 in accordance with this invention and a torsion rod 155. Each flexible pivot 153 (FIGS. 7–17) includes a pair of blocks 157 and 159. Each block 157, 159 has a face 161 abutting its supporting structure and an opposite face 163 of substantially smaller area. The face 163 has a groove 165 at the center into which slots 167 open. The groove 165 and the slots 167 extend along the whole width of each block. The slots 167 (that is, their center lines and sides) are at equal angles to the center plane between the faces 161 and 163. The slanting faces 169 are penetrated by holes 171 which open into the respective slots 167. The face 161 of each block 157, 159 is slightly concave (FIGS. 7 and 14) to give a pinching action by the blocks 157 and 159 on the flexing members 173 and 174 in the slots 167.

Each flexible pivot 153 also includes a pair of flexible or resilient members 173 and 174 (FIGS. 9, 10). Each member 173 and 174 is of generally I-cross-section with long rigid ends 175 of substantial thickness and a thin flexible web 177. The ends are penetrated by holes 179. Typically the members 173 and 174 are composed of a high-strength steel, for example maraging steel.

The members 173 and 174 are secured in the coextensive slots 167 of the blocks 157 and 159, one flush with the faces 181 on one side and the other flush with the faces on the opposite side, with the webs 177 extending into the grooves 165. In FIGS. 5–17, member 173 is shown flush with the face 181 in the drawing and member 174 flush with the opposite face. The members 173–174 are securely held in the blocks 157 and 159 by pins 160 which are firmly secured in holes 171 and 179 and by the pinching action of the blocks.

Block 157 of each flexible or resilient pivot 153 is secured to the plate 139 (FIGS. 2 and 4) of the fixed support 135 by bolts 185 and 186 (FIGS. 2, 4) and pins 187, each of the latter passing through coextensive openings 189 (FIGS. 5–17) in the blocks 157 and in the plate 139. Bolt 186 when secured in thread 188 pulls the concave surface 161 outwardly distorting block 157 and producing a pinching action on the members 173, 174. Block 159 of each flexible pivot 153 is secured to plate 145 (FIG. 2) of the rocker support 133 by bolts 191 and by pins 193. The head-stock 51 and the tail-stock 53 are secured to plate 147 of the rocker support 133 by bolts 195 and 197 which are screwed into bosses 199 and 201 respectively of the housings 71 and 126 respectively and pass through bosses 203 and 205 respectively of plate 147.

The weight of the rocker support 133 and the parts connected to it including the head-stock 51 and the tail-stock 53, which is substantial and would tend to distort the flexible pivots 153, is taken up by the torsion rod 155. The rod 155 is secured to a bracket 207 welded to the plate 139 and suspends the rocker support 133 and its parts from another bracket 209 secured at one end to the rod 155 and at the other to the plate 145.

The webs 177 of the crossed members 173, 174 of each flexible pivot 153 may be out of contact edgewise or may be in contact edgewise at the centers of their edges. In either event the flexing axis of each pivot is along the line of intersection of the crossed webs 177. The flexing pivots 153 and the rod 155 are mounted with their axes colinear. The rocker support 133 and the parts secured to it are capable of flexing about the common axis of the pivots 153 and rod 155, the webs 177 flexing and the rod twisting in torsion in accordance with the flexing of the rocker support 133. Since the surfaces 163 of each flexing pivot 153 are spaced only a small distance (typically 0.0185 inch) the angle over which the webs 177 and the rod 155 can twist is relatively small and is well within the proportional limit of the webs and rod. The head-stock 51 and tail-stock 53 are suspended a substantial distance from the axis and are moveable over a substantial distance with the rocker support.

Figure 2:
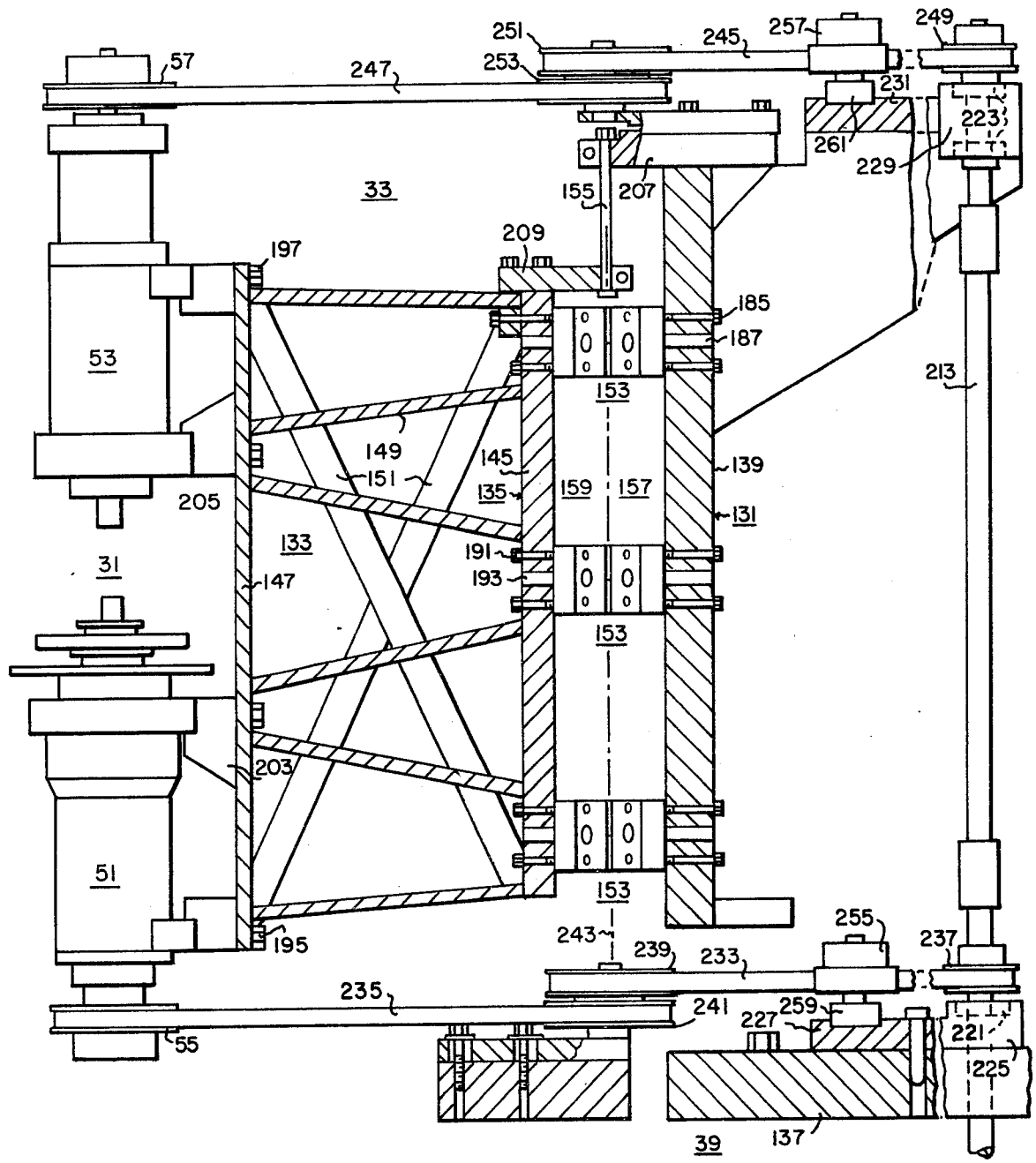
FIG. 2 is a view in section taken along line II—II of FIG. 1.
Figure 3:
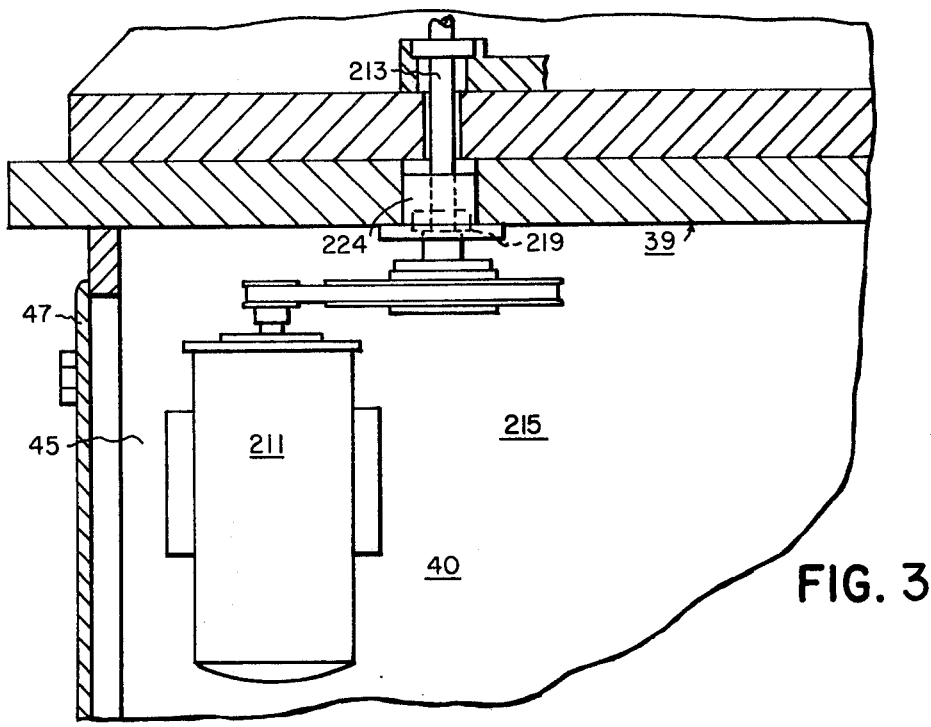
FIG. 3 is a view in section along line III—III of FIG. 1.
Figure 4:
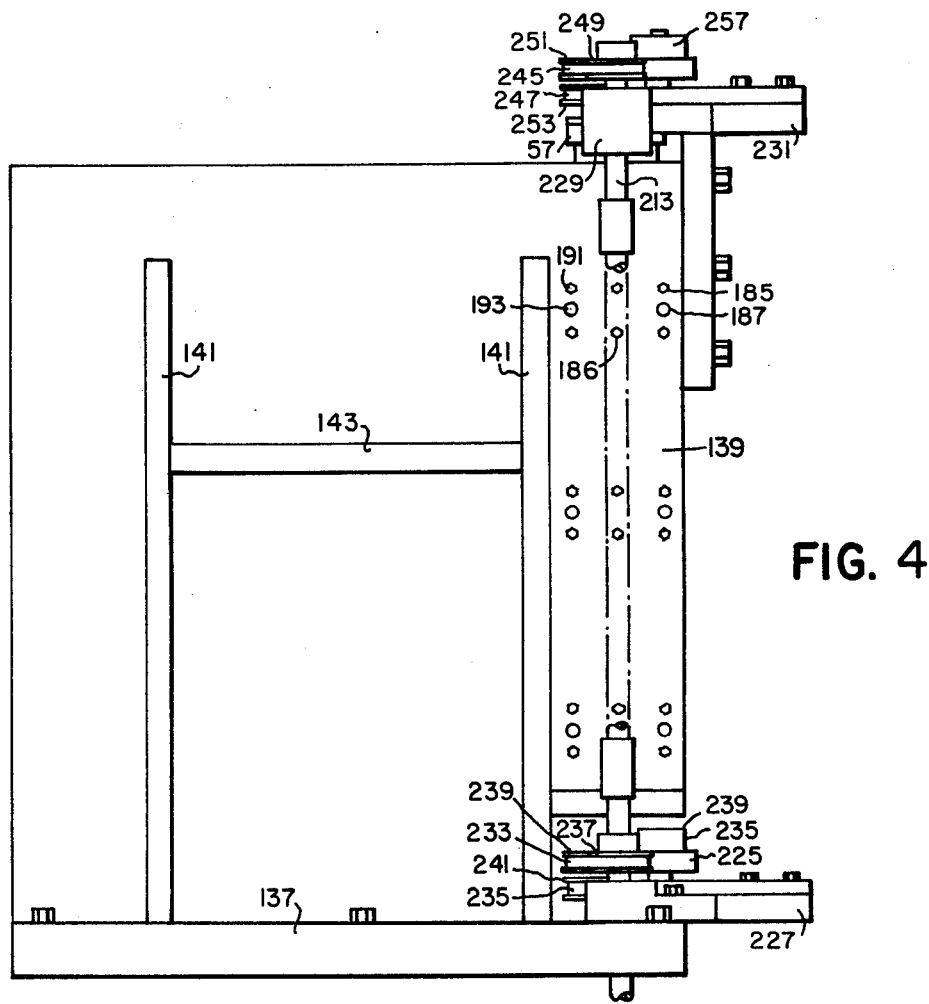
FIG. 4 is a view in end elevation of the part of the apparatus shown in FIG. 1.

The head-stock 51 and tail-stock 53 are rotated through the pulleys 55 and 57 (FIG. 2) from a motor 211 (FIG. 3) mounted in the enclosure 45 of the machine base 40. The motor 211 drives a shaft 213 through reduction belt drive 215. The shaft 213 is rotatable in bearings 219, 221, 223 (FIG. 2). The bearings 219 are mounted in a sleeve 224 (FIG. 3) in table 39 engaging a shoulder on shaft 213. The bearings 221 are mounted in a boss 225 (FIGS. 2, 4) of bracket 227 secured to base 137; the bearings 223 are mounted in a boss 229 of an angle bracket 231 secured to plate 139.

The head-stock 51 is rotated by a belt drive including belts 233, 235 (FIG. 2), pulley 237 on shaft 213, pulleys 239 and 241 approximately coaxial with the axis 243 of the flexing pivot 135, and the pulley 55. The tail-stock 53 is rotated by a belt drive including belts 245 and 247, pulley 249 on shaft 213, pulleys 251 and 253 approximately coaxial with the axis 243 and the pulley 57. Belts 233 and 245 are maintained tight by idler pulleys 255 and 257 respectively. Pulley 255 is adjustably mounted on bracket 259 and pulley 257 on bracket 261. The belts 233, 235, 245, 247 are timing belts having teeth which mesh with the teeth in pulleys 237, 239, 241, 55 and 249, 251, 253, 57. Since the motor 211 is mounted on a plate in enclosure 45 (FIG. 3) the rocker support 133 is relieved of carrying the weight of the motor. The pulleys 239, 241 and 251, 253 are approximately centered on the axis 243 so that the drive is not affected by the rocking of the rocker support 133.

While a preferred embodiment of this invention has been disclosed herein, many modifications thereof are feasible. This invention is not to be restricted except insofar as is necessitated by the spirit of the prior art.

I claim:

1. A flexible pivot including first and second members, each member having relatively thick rigid end sections integrally joined by a relatively thin central flexible section, and also including first and second blocks, said members and blocks being connected in a flexible assembly with a surface of said first block opposite and generally parallel to a corresponding surface of said second block, the end sections of said first member penetrating into said blocks, each through a said surface of a block, and being secured each in a block transversely to said surfaces between said blocks with the thin section extending between said blocks, and the end sections of said second member penetrating into said blocks each through a said surface of a block and being secured each in a block also transversely to said surfaces between said blocks with its thin section extending between said blocks, the thin section of said first member being displaced with respect, and at an angle, to the thin section of said second member, the intersection of the planes of said thin sections defining a pivotal axis.

2. Flexible pivot apparatus including a fixed support, a rocker support, first and second flexible members, each member having relatively thick rigid end sections joined by a relatively thin central flexible section, first and second blocks, said members and blocks being connected in a flexible assembly with a first surface of said first block opposite and generally parallel to a corresponding first surface of said second block, said end sections of said first member penetrating into said blocks, each through a said surface of a block, and being secured each in a block transversely to said surfaces between said blocks and said end sections of said second member penetrating into said blocks, each through a said surface of a block, and being secured each in a said block transversely to said surfaces between said blocks with its thin section extending between said blocks, the thin section of said first member being displaced with respect, and at an angle, to the thin sections of said second member, the intersection of the planes of said thin sections defining a pivotal axis, means, penetrating and engaging in a third surface of said first block which is opposite to the first surface of said first block, for securing said first block to said fixed support, and means, penetrating and engaging in a fourth surface of said second block which is opposite to said second surface of said second block, for securing said second block to said rocker support.

3. A flexible pivot including first and second members, each member having relatively thick rigid end sections integrally joined by a relatively thin central flexible section, and also including first and second blocks, said members and blocks being connected in a flexible assembly with a surface of said first block opposite and generally parallel to a corresponding surface of said second block, the end sections of said first member being secured each in a block transversely to said surfaces between said blocks with its thin section extending between said blocks, and the end sections of said second member being secured each in a block also transversely to said surfaces between said blocks with its thin section extending between said blocks, the thin section of said first member being displaced with respect, and at an angle, to the thin section of said second member, the thin flexible section of said first member being at an angle substantially different than 90° to said surfaces and the thin flexible section of said second member also being at an angle substantially different than 90° to said surfaces, the plane, through the line of intersection of the planes of said thin sections, perpendicular to said surfaces, bisecting the angle between said thin sections the intersection of the planes of said thin sections defining a pivotal axis.

4. The flexible pivot of claim 3 wherein opposite sides of each block extend from the ends of its corresponding one of the opposite parallel surfaces, and the thin flexible section of the first member extends between one of the opposite sides of the first block and a corresponding opposite side of the second block and the thin flexible section of the second member extends between the remaining opposite side of the first block and the remaining opposite side of the second block.

5. The resilient pivot of claim 3 wherein the spacing between the opposite parallel surfaces is small so that the surfaces limit the angle over which the thin flexible sections are pivotal and wherein the clamping means is at a substantial distance from the pivotal axis.

6. A flexible pivot including first and second members, each member having relatively thick rigid end sections integrally joined by a relatively thin central flexible section, and also including first and second blocks, said members and blocks being connected in a flexible assembly with a surface of said first block opposite to a corresponding surface of said second block, the end sections of said first member being secured each in a block transversely to said surfaces between said blocks with the thin section extending between said blocks, and the end sections of said second member being secured each in a block also transversely to said surfaces between said blocks with its thin section extending between said blocks, the thin section of said first member being displaced with respect, and at an angle, to the thin section of said second member, the intersection of the planes of said thin sections defining a pivotal axis, each said block having, in addition to its said surface which is opposite to a said corresponding surface of said other block, a surface from which each said block is supported, said last-named surface being slightly concave and including means for receiving securing means positioned so that the pull of said securing means tends to reduce the concavity of said surface pinching said end sections of said members and firmly securing said end sections.

7. Flexible pivot apparatus including a fixed support, a rocker support, first and second flexible members, each member having relatively thick rigid end sections joined by a relatively thin central flexible section, first and second blocks, said members and blocks being connected in a flexible assembly with a first surface of said first block opposite to a corresponding first surface of said second block, said end sections of said first member being secured each in a block transversely to said surfaces between said blocks and said end sections of said second member being secured each in a said block transversely to said surfaces between said blocks with its thin section extending between said blocks, the thin section of said first member being displaced with respect, and at an angle, to the thin sections of said second member, the intersection of the planes of said thin sections defining a pivotal axis means, penetrating and engaging in a third surface of said first block which is opposite to the first surface of said first block, for securing said first block to said fixed support, and means, penetrating and engaging in a fourth surface of said second block which is opposite to said second surface of said second block, for securing said second block to said rocker support, said third and fourth surfaces each being slightly concave whereby said respective securing means pull said surfaces outwardly pinching the end sections of said members firmly securing said end sections.

8. A flexible pivot including first and second members, each member having relatively thick rigid end sections integrally joined by a relatively thin central flexible section, and also including first and second blocks, said members and blocks being connected in a flexible assembly with a surface of said first block opposite and generally parallel to a corresponding surface of said second block, the end sections of said first member being secured each in a block transversely to said surfaces between said blocks with its thin section extending between said blocks, and the end sections of said second member being secured each in a block also transversely to said surfaces between said blocks with its thin section extending between said blocks, the thin section of said first member being displaced with respect, and at an angle, to the thin section of said second member, the thin flexible section of said first member being at an angle substantially different than 90° to said surfaces and the thin flexible section of said second member also being at an angle substantially different than 90° to said surfaces, the intersection of the planes of said thin sections defining a pivotal axis.

9. A flexible pivot including first and second members, each member having relatively thick rigid end sections joined by a relatively thin central flexible section, and also including first and second blocks, said blocks having corresponding surfaces, each surface penetrated by slots, extending into said last-named surface from an apex near said surface, at angles to said surface, said members and blocks being connected in a flexible assembly with said blocks oppositely disposed with said corresponding surfaces of said blocks opposite each other and each said slot in one block coextensive with a corresponding oppositely disposed slot in the opposite block, the end sections of said first member extending respectively into one set of coextensive slots in said opposite blocks with its thin central section extending between said blocks and the end sections of said second member extending respectively into another set of coextensive slots in said blocks with its thin central section extending between said blocks, said thin section of said first member being displaced along said corresponding surfaces with respect, and at an angle, to the thin section of said second member, the intersection of the planes of said thin sections defining a pivotal axis.

10. The flexible pivot of claim 9 wherein the angle between the slots is substantially smaller than 90° whereby the angle between the thin flexible sections is substantially less than 90°.

11. The flexible pivot of claim 9 wherein the end sections of the first and second members are elongated and are engaged by the walls of the slots substantially along their whole lengths and substantially only the thin flexible sections extend between the blocks.

* * * * *